3,551,424
METHANODIOXOCINS AND A PROCESS FOR
MAKING THEM
Henry E. Hennis, Coleman, Mich., assignor to The Dow
Chemical Company, Midland, Mich., a corporation of
Delaware
No Drawing. Filed Sept. 22, 1967, Ser. No. 669,694
Int. Cl. C07d 7/04, 51/46
U.S. Cl. 260—251                                                     21 Claims

ABSTRACT OF THE DISCLOSURE

New methanodioxocins having the formula

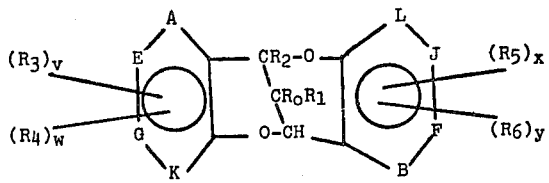

are made by reacting an o-vinylhydroxy aromatic compound and an o-hydroxyaldehyde aromatic compound in the presence of an acid catalyst. A, B, E, F, G, J, K, and L are N or CH. They are useful as herbicides, insecticides and chemical intermediates.

BACKGROUND OF THE INVENTION

Methanodioxocin synthesis is sparsely reported in the literature. Synthesis of dibenzodioxocins of the type

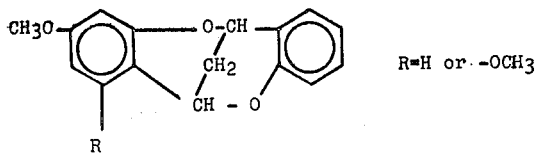

has been reported in Tetrahedron Letters, No. 44, 5357 (1966). The method of preparation there was cyclization of 2,2'-dihydroxy-4'-methoxychalcone and acid treatment following reduction with sodium borohydride. The following dibenzodioxocins have been reported as similarly synthesized in Tetrahedron Letters, No. 5, 531 1966):

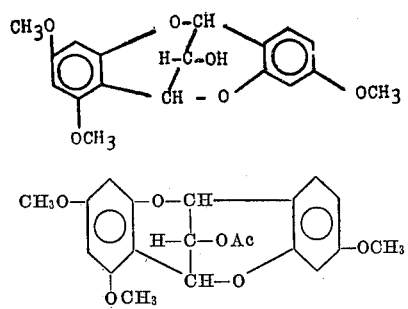

and cyanomaclurin, the compound below,

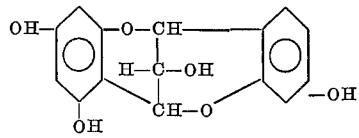

has been reported as isolated in Tetrahedron Letters, No. 5, 317 (1963).

SUMMARY OF THE INVENTION

This invention is a new class of compounds having the formula

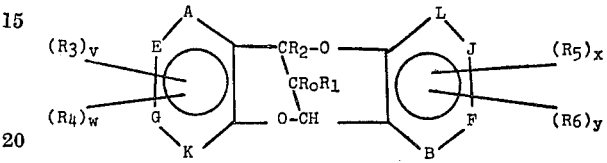

It is also a process for making dioxocins by reacting an o-vinylhydroxy aromatic compound having the formula

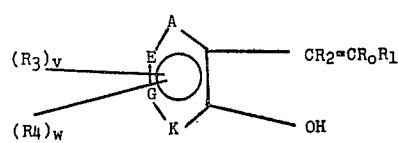

and an o-hydroxyaldehyde aromatic compound having the formula

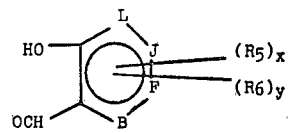

in the presence of an acid catalyst. In the above formulas, each of $v$, $w$, $x$ and $y$ independently is a number from 0 to 4; each of A, B, E, F, G, J, K and L independently is N or CH provided that neither A and E, E and G, G and K, B and F, F and J, or J and L can simultaneously be N; $R_0$ is H; $R_1$ is H, OH, aryl having up to ten carbon atoms (preferably those having up to six carbon atoms), or alkyl having up to eighteen carbon atoms (preferably those having up to four carbon atoms); $R_2$ is H, aryl having up to ten carbon atoms (preferably those having up to six carbon atoms), or alkyl having up to eighteen carbon atoms (preferably those having up to four carbon atoms); each of $R_3$, $R_4$, $R_5$ and $R_6$, if present, independently is a substitutent inert under the reaction conditions being absent when the corresponding subscript $v$, $w$, $x$ or $y$ is 0, and $R_3$ combined with $R_4$, as well as $R_5$ combined with $R_6$, may form a heterocyclic or homocyclic ring which is inert under the reaction conditions. Examples of $R_3$, $R_4$, $R_5$ or $R_6$ substituents are alkyl (preferably those having up to eighteen carbon atoms; most preferably those having up to six carbon atoms), aryl (preferably those having up to ten carbon atoms;

most preferably those having up to six carbon atoms), NO₂, halogen, and OM where M is H or a hydrocarbon radical of up to eighteen carbon atoms (preferably an alkyl radical having up to four carbon atoms), provided that M is H or methyl only when one of A, B, E, F, G, J, K or L is N or when R₁ or R₂ is other than H. Examples of heterocyclic or homocyclic rings formed by R₃ combined with R₄, as well as R₅ combined with R₆, are the pyridine, pyrimidine, quinoline, benzene, naphthalene, anthracene, phenanthrene, and pyran rings. An example of a specific new compound is 6H,12H - 6,12 - methanodibenzo[b,f][1,5]dioxocin (MDBD).

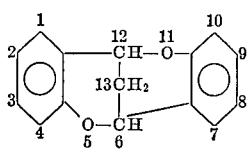

where in the general formula above the numerals indicate the numbering system used herein to indicate the position of substituents, R₀, R₁, and R₂ are H, $v$, $w$, $x$ and $y$ are 0 and A, B, E, F, G, J, K and L are CH. MDBD is made by reacting o-vinylphenol and salicylaldehyde in acidic medium.

In order to produce these new dioxocins, and o-vinylhydroxy aromatic compound and an o-hydroxyaldehyde aromatic compound, both as defined above, except that M is now H or a hydrocarbon radical of up to eighteen carbon atoms (preferably an alkyl radical of up to four carbon atoms), are reacted in the presence of an acid catalyst. Suitable catalysts include aqueous HBr; aqueous HBr and a liquid organic acid such as acetic, propionic or butyric; or a hydrocarbon-acid system where the hydrocarbon is one which is inert under the reaction conditions; for example toluene, xylene, benzene, petroleum ether or other saturated hydrocarbons (also including halohydrocarbons such as dichloromethane, chloroform, and carbon tetrachloride) and the acid is H₂SO₄, HCl, HBr, p-toluenesulfonic acid or the like. The aromatic reactants may be in any molar ratio, and pressure, temperature, and time limitations are not critical to my invention. I prefer to use atmospheric pressure but the reaction will occur at subatmospheric and superatmospheric pressures. In the heterogeneous reactions, e.g., those using aqueous HBr as the acid, I prefer to heat the reaction mixture to boiling for eight hours, but higher or lower temperatures may be used and the reaction will occur by reacting for shorter or longer periods of time. In the homogeneous reactions, e.g. those using liquid organic acid-aqueous HBr or the hydrocarbon-acid system, I prefer to conduct the reaction at room temperature for 30-60 minutes but one may use higher or lower temperatures and longer or shorter periods of time. After reaction, the dioxocin is separated from the starting materials and by-products, as for example, by extracting the latter with a strong base such as sodium hydroxide or potassium hydroxide. All of the reactant o-vinylhydroxy and o-hydroxyaldehyde aromatic componds are known or can be made by use of conventional processes.

These new compounds have biological activity. They are useful as herbicides and insecticides. They are also useful as chemical intermediates. or example, they may be hydogenated in the presence of a catalyst to produce 2,2'-trimethylenedihydroxyaromatic compounds as more fully set out in my application filed concurrently herewith, Ser. No. 669,706 entitled "2,2'-Trimethylenedihydroxy-aromatic Synthesis." The hydrogenated compounds are useful in resin production.

DESCRIPTION OF PREFERRED EMBODIMENTS

Specific examples of production of these new dioxocins follow. In all of the examples, the temperature is in °C. and the pressure is one atmosphere unless otherwise stated. Also, in each case where o-coumaric acid appears to be a reactant, the actual reactant is o-vinylphenol since the latter is formed in situ from the decarboxylation of o-coumaric acid. In all examples where reflux temperature is mentioned, that temperature is the boiling point of the mixture at atmospheric pressure.

Example 1.—6H, 12H-6,12-methanodibenzo-[b,f] [1,5]-dioxocin (MDBD) from the reaction of o-vinylphenol and salicylaldehyde

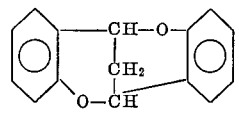

A mixture of 5.2 g. (0.0434 mole) of o-vinylphenol, 7.5 g. (0.0615 mole) of salicylaldehyde, 50 ml. of water, and 5 ml. of concentrated hydrobromic acid was heated at the reflux temperature for 12 hours. Then 75 ml. of 10% sodium hydroxide solution was added and the mixture was heated at the reflux temperature for 1 hour. The yellow solid which remained was collected on a Buchner funnel and recrystallized from an ethanol-water mixture to yield 0.444 g. (4.6%) of white needles, M.P. 160–160.5°. This compound may be hydrogenated to produce 2,2'-trimethylenediphenol, a bisphenol useful in phenol-aldehyde, polyester and epoxy production.

Example 2.—MDBD from the reaction of o-coumaric acid and salicylaldehyde

A mixture of 8.2 g. (0.050 mole) of o-coumaric acid, 9.7 g. (0.075 mole) of salicylaldehyde, 75 ml. of water, and 5 ml. of concentrated hydrobromic acid was heated at the reflux temperature for 12 hours. Then 100 ml. of 10% sodium hydroxide solution was added and this mixture was heated at the reflux temperature for an hour. The yellow solid which remained was collected on a Buchner funnel, washed with water, and recrystallized from an ethanol-water mixture to yield 0.52 g. (4.6%) of white needles, M.P. 159–160.5° C. Actual reactant is o-vinylphenol.

Example 3.—13-methyl-MDBD

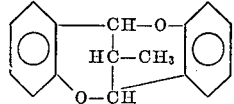

2-propenylphenol (15 g., 0.112 mole) and 18.3 g. (0.15 mole) of salicylaldehyde were dissolved in 150 ml. of benzene. Concentrated sulfuric acid (0.5 ml., 95.5%) was added dropwise into the well-stirred mixture at room temperature. The reaction mixture was kept at room temperature for one more hour after the addition of the sulfuric acid. A brown solid by-product was formed. At the end of the reaction, the mixture was extracted four times with 10% sodium hydroxide solution. The remaining colorless benzene solution was distilled to dryness and the residue was recrystallized from an ethanol-water mixture. 13-methyl-MDBD crystallized as white needles (23%), M.P. 136–138°. When used at a concentration of five parts per million, this compound kills 90% of exposed mosquito larvae.

Example 4.—6-ethyl-13-methyl-MDBD

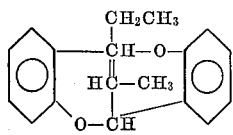

2-(1-ethylpropenyl)phenol (3 g., 0.0185 mole) and 2.5 g. (0.02 mole) of salicylaldehyde were dissolved in 50 ml. of benzene. At room temperature, 0.3 ml. of concentrated sulfuric acid (95.5%) was added dropwise into the benzene solution and then stirred at room temperature for one hour. A brown precipitate formed in the reaction mixture. The mixture was then extracted four times with 10% sodium hydroxide solution. The colorless benzene solution was distilled to dryness and the residue recrystallized from ethanol to give white needles, M.P. 154–155°. The yield was 1.9 g. (38.4%).

*Analysis.*—Calc'd for $C_{17}H_{18}O_2$ (percent): C, 81.10; H, 6.77. Found (percent): C, 80.6; H, 6.81. This compound may be hydrogenated to roduce 2-methyl-1,3-di-(2-hydroxyphenyl)pentane, a bisphenol useful in preparing polycarbonate and epoxy resins.

Example 5.—2-methyl-MDBD

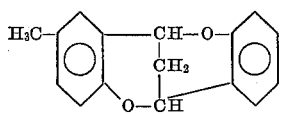

A mixture of 178 g. (1 mole) of 2-hydroxy-5-methylcinnamic acid, 122 g. (1 mole )of salicylaldehyde, 1500 ml. of water, and 100 ml. of 48% hydrobromic acid was heated at the reflux temperature for 16 hours. Then 2000 ml. of 10% sodium hydroxide solution was added and this mixture was heated at the reflux temperature for an hour. The yellow solid which remained was collected on a filter, washed with water, and recrystallized from an ethanol-water mixture to yield 12.6 g. (5.3%) of white needles, M.P. 126–128°.

*Analysis.*—Calc'd for $C_{16}H_{14}O_2$ (percent): C, 80.67; H, 5.88. Found (percent): C, 80.9; H, 5.93. This compound may be hydrogenated to produce 1-(2-hydroxyphenyl)-3-(5-methyl-2 - hydroxyphenyl)propane, a bisphenol that is converted to useful resinous material by reacting with phosgene to form polycarbonate polymers or with epichlorohydrin and alkali to form epoxy resins.

Example 6.—8H,14H-8,14-methanobenzo (a) dibenzo [b,f][1,5]dioxocin (MBDBD)

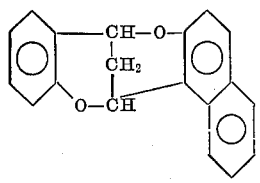

A mixture of 16.4 g. (0.1 mole) of o-coumaric acid, 17.2 g. (0.1 mole) of 2-hydroxy-1-naphthaldehyde, 150 ml. of water and 10 ml. of 48% hydrobromic acid was heated at the reflux temperature for 16 hours. Then 200 ml. of 10% sodium hydroxide solution was added and this mixture was heated at the reflux temperature for an hour. The yellow solid which remained was collected on a filter, washed with water, and recrystallized from a tetrahydrofuran - ethanol mixture. After two days at room temperature, white crystals separated. Two recrystallizations from ethanol-water mixtures gave white crystals, M.P. 128–131°, yield 0.98 g. (3.6%).

*Analysis.*—Calc'd for $C_{19}H_{14}O_2$ (percent): C, 83.21; H, 5.11. Found (percent): C, 83.4; H, 5.15. This compound may be hydrogenated to produce 1-(o-hydroxyphenyl)-3-(β-hydroxy - α - naphthyl)propane, a phenolnaphthol which is converted by well known processes into polycarbonate or epoxy resin intermediates.

Example 7.—8,15-dimethyl-MBDBD

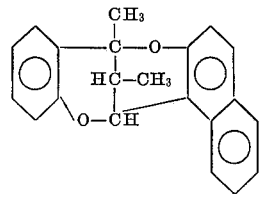

A mixture of 1.5 g. (0.01 mole) of 2-(1-methyl-propenyl)phenol, 2 g. (0.012 mole) of 2-hydroxy-1-naphthaldehyde and 10 ml. of glacial acetic acid was stirred at room temperature. Hydrobromic acid (5 ml., 48%) was added to this mixture and it was kept at room temperature with stirring for one hour. Then 10% sodium hydroxide solution was added slowly to this mixture until the solution showed strong alkalinity (pH ca. 10). The yellow solids which were suspended in the solution were filtered, washed with water, and recrystallized from an ethanol-water mixture. Two recrystallizations from aqeuous ethanol gave white crystals, M.P. 192–193°, yield 1.26 g. (42%).

*Analysis.*—Calc'd for $C_{21}H_{18}O_2$ (percent): C, 83.44; H, 5.96. Found (percent): C, 83.6; H, 6.17. This compound may be hydrogenated to produce 2-methyl-1-(β-hydroxy-α-naphthyl) - 3 - (o-hydroxyphenyl)butane, a phenol-naphthol type compound which is converted to resin intermediates by conventional methods.

Example 8.—2-nitro-MDBD

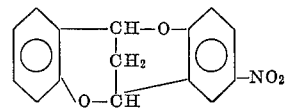

A mixture of 8.2 g. (0.050 mole) of o-coumaric acid, 8.4 g. (0.05 mole) of 5-nitrosalicylaldehyde, 75 ml. of water and 5 ml. of 48% hydrobromic acid was heated at reflux temperature for 16 hours. Then 100 ml. of 10% sodium hydroxide solution was added and this mixture was heated at reflux temperature for an hour. The yellow solid which remained was collected, washed with water, and recrystallized from an ethanol-water mixture to give 0.5 g. (4.3%) of white needles, M.P. 158–160. The I.R. spectrum showed strong —$NO_2$ absorption at 1540 cm.$^{-1}$ and 1350 cm.$^{-1}$.

*Analysis.*—Calc'd for $C_{15}H_{11}NO_4$ (percent): C, 66.91; H, 4.09; N, 5.20. Found (percent): C, 66.80; H, 4.00; N, 5.23. When used at a concentration of 500 parts per million, this compound kills 80% of American cockroach.

Example 9.—2-bromo-MDBD

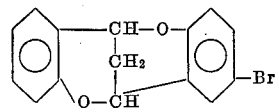

A mixture of 164 g. (1 mole) of o-coumaric acid, 201 g. (1 mole) of 5-bromosalicylaldehyde, 1500 ml. of water, and 100 ml. of 48% hydrobromic acid was heated at the reflux temperature for 16 hours. Then 2000 ml. of 10% sodium hydroxide solution was added and this mixture was heated at the reflux temperature for an hour.

The yellow solid which remained was collected on a filter, washed with water, and recrystallized from an ethanol-water mixture to yield 18.2 g. (6%) of white needles, M.P. 168–169°.

*Analysis.*—Calc'd for $C_{15}H_{11}BrO_2$ (percent): C, 59.41; H, 3.63; Br, 26.40. Found (percent): C, 59.20; H, 3.47; Br, 26.30. This compound may be hydrogenated to give a resin starting material which is converted to a resin by way of the processes shown in the other examples.

Example 10.—6,11-dimethyl-7H,13H-7,13-methano (1,5)-benzodioxocino(3,4-c)-quinoline

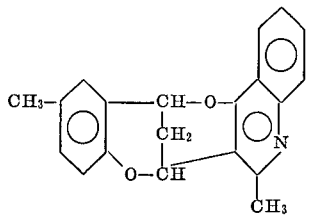

A mixture of 8.0 g. (0.04 mole) of 2-hydroxy-5-methylcinnamic acid, 4 g. (0.021 mole) of 2-methyl-4-hydroxyquinoline-3-carboxaldehyde, 100 ml. of water and 10 ml. of 48% hydrobromic acid was heated at the reflux temperature for 16 hours. Then 150 ml. of 10% sodium hydroxide solution was added and this mixture was heated at the reflux temperature for an hour. The yellow solid which remained was collected on a filter, washed with water, and recrystallized from ethanol-water mixture with two Norite treatments. White needles, M.P. 173–175°, yield 0.83 g. (13%) were obtained.

*Analysis.*—Calc'd for $C_{20}H_{17}NO_2$ (percent): C, 79.21; H, 5.61; N, 4.62. Found (percent): C, 79.4; H, 5.72; N, 4.52. When used at a concentration of 5 parts per million, this compound kills 90% of Yellow Fever mosquito larvae.

Example 11.—6-ethyl-13-methyl-6H,12H-6,12-methano (1,5)benzodioxocino(3,4-b)-pyridine

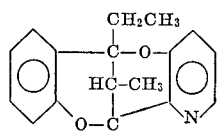

A mixture of 4 g. (0.032 mole) of 3-hydroxypyridine-2-carboxaldehyde and 6 g. (0.037 mole) of 2-(1-ethylpropenyl)phenol and 20 ml. of glacial acetic acid was stirred at room temperature. Hydrobromic acid (10 ml., 48%) was added to this mixture and it was kept at room temperature with stirring for four hours. Then 10% sodium hydroxide solution was added slowly to this mixture until the solution showed strong alkalinity. Heat of neutralization was dissipated by adding cracked ice. The alkaline insoluble solid was filtered, washed with water and recrystallized from ethanol or dimethylformamide. The alkaline solution was extracted with chloroform. From both ethanol recrystallization and chloroform extraction, the same white cubic crystals of M.P. 196–197° were obtained. IR and elemental analysis indicated that this compound contains one mole water of recrystallization. The yield was 1.6 g. (18.7%).

*Analysis.*—Calc'd for $C_{17}H_{17}NO_2 \cdot H_2O$ (percent): C, 71.68; H, 6.67; N, 4.91. Found (percent): C, 71.8; H, 6.71; N, 4.89. When used at a concentration of 10 pounds per acre, this compound will cause a 10% retardation in bean growth.

Example 12.—2-methoxy-12-ethyl-13-methyl-MDBD

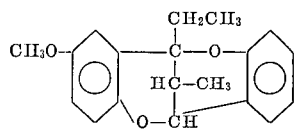

4-methoxy-2-(1-ethylpropenyl)phenol (9.6 g., 0.05 mole) and salicylaldehyde 9.6 g., 0.078 mole) were dissolved in 250 ml. of benzene. Concentrated sulfuric acid (0.5 ml., 95.5%) was added dropwise into the well-stirred mixture at room temperature. The reaction mixture was kept at room temperature with stirring for half an hour to one hour. A brown solid suspended in the benzene solution was observed. The reaction mixture was extracted four times with 100 ml. of 10% aqueous sodium hydroxide solution. The benzene solution was evaporated to dryness. The remaining white solid was recrystallized from an acetone-water mixture to give 12.08 g. (81.6%) of 2-methoxy-12-ethyl-13-methyl-MDBD, white needles, M.P. 180–182°.

*Analysis.*—Calc'd for $C_{19}H_{20}O_3$ (percent): C, 77.03; H, 6.76. Found (percent): C, 77.00; H, 6.96. This compound may be hydrogenated to 2-methyl-1-(2-hydroxyphenyl)-3-(5-methoxy-2-hydroxyphenyl)pentane, a bisphenol useful for the preparation of bisphenol type resins by conventional processes.

Example 13.—2-hydroxy-12-ethyl-13-methyl-MDBD

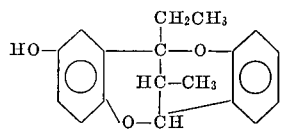

4-hydroxy-2-(1-ethylpropenyl)phenol (5.3 g., 0.03 mole) and salicylaldehyde (4.9 g., 0.04 mole) were dissolved in 200 ml. of benzene. Concentrated sulfuric acid (0.4 ml., 95.5%) was added dropwise into the well-stirred mixture at room temperature. The reaction mixture was kept at room temperature with stirring for one hour. After the reaction was over, benzene was evaporated off in a rotary evaporator and the brown residue recrystallized from an acetone-water mixture. After three recrystallizations from acetone-water mixtures and a Norite treatment, white needles, M.P. 211–212°, yield 1.8 g. (21.2%) were obtained.

*Analysis.*—Calc'd for $C_{18}H_{18}O_3$ (percent): C, 76.60; H, 6.38. Found (percent): C, 76.70; H, 6.30. This compound may be hydrogenated to 2-methyl-1(2-hydroxyphenyl)-3-(2,5-dihydroxyphenyl)pentane, a compound not obtainable by usual bisphenol synthesis which is useful in resin production by way of the usual processes.

Example 14.—Spiro(cyclohexane-1,13',6-methyl-MDBD)

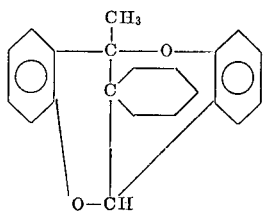

A mixture of o-(1-cyclohexylidenethyl)-phenol (15.2 g., 0.075 mole), 30 g. (0.3 mole) of salicylaldehyde, and 50 g. of acetic acid were stirred while 30 g. of hydrobromic acid (48%) was added and then stirred for an additional ten minutes. The reaction mixture was poured into excess 10% NaOH solution and the mixture was heated to reflux temperature. The alkaline mixture was extracted with toluene. The toluene was then removed by distillation to leave 6.1 g. of yellow oil residue. The combination of gas liquid chromatography and nuclear magnetic resonance spectroscopy showed the mixture to be 10% of the above named product. This compound may be hydrogenated to give a resin building block similar to those in the previous examples.

Compounds which were made by our process are shown in Table I below. In each case, $R_0$ is H and where any of $R_3$, $R_4$, $R_5$, and $R_6$ is an inert substituent, $w$, $v$, $x$ and $y$ are 1 except where designated.

TABLE I

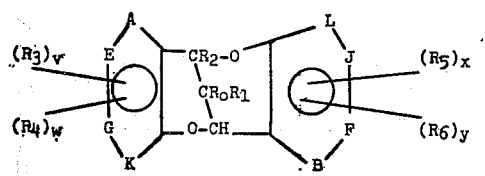

| Melting point (° C.) | $R_1$ | $R_2$ | $R_3$ | $R_4$ | $R_5$ | $R_6$ | $R_5+R_6$ | A | B | E | F | G | J | K | L |
|---|---|---|---|---|---|---|---|---|---|---|---|---|---|---|---|
| 160–160.5 | H | H | | | | | | CH | CH | CH | CH | CH | CH | CH | CH |
| 168–169 | H | H | | | Br | | | CH | CH | CH | C | CH | CH | CH | CH |
| 158–160 | H | H | | | $NO_2$ | | | CH | CH | CH | C | CH | CH | CH | CH |
| 128–128.5 | H | H | $CH_3$ | | | | | CH | CH | C | CH | CH | CH | CH | CH |
| 122–122.5 | H | $CH_3$ | | | | | | CH | CH | CH | CH | CH | CH | CH | CH |
| 129–130 | H | $CH_3$ | $OCH_3$ | | | | | CH | CH | CH | C | CH | CH | CH | CH |
| 143–145 | H | $CH_3$ | Cl | | | | | CH | CH | C | CH | CH | CH | CH | CH |
| 145–146 | H | $CH_3$ | Br | | | | | CH | CH | C | CH | CH | CH | CH | CH |
| 160–161 | H | $CH_3$ | $CH_3$ | | | | | CH | CH | C | CH | CH | CH | CH | CH |
| 137.5–138.5 | $CH_3$ | H | | | | | | CH | CH | CH | CH | CH | CH | CH | CH |
| 140–141 | $CH_3$ | H | $CH_3$ | | | | | CH | CH | C | CH | CH | CH | CH | CH |
| 132–140 | $CH_3$ | H | | | Br | | | CH | CH | CH | C | CH | CH | CH | CH |
| 165–165.5 | $CH_3$ | H | OH | | | | | CH | CH | C | CH | CH | CH | CH | CH |
| 156–157 | $CH_3$ | $CH_3$ | | | | | | CH | CH | CH | CH | CH | CH | CH | CH |
| 141.5–142.5 | $CH_3$ | H | $CH_3$ | | $CH_3$ | | | CH | CH | C | C | CH | CH | CH | CH |
| 197–198 | $CH_3$ | H | Cl | Cl | | | | CH | CH | C | CH | CH | CH | C | CH |
| 184–186 | $CH_3$ | H | Cl | Cl | Cl | Cl | | CH | CH | C | C | CH | CH | C | C |
| 154–155 | $CH_3$ | $CH_2CH_3$ | | | | | | CH | CH | CH | CH | CH | CH | CH | CH |
| 180.5–181.5 | $CH_3$ | $CH_2CH_3$ | $CH_3$ | | | | | CH | CH | C | CH | CH | CH | CH | CH |
| 211–212 | $CH_3$ | $CH_2CH_3$ | OH | | | | | CH | CH | C | CH | CH | CH | CH | CH |
| 177–179 | $CH_3$ | $CH_2CH_3$ | Br | | | | | CH | CH | CH | CH | CH | CH | C | CH |
| 143–145 | $CH_3$ | $CH_2CH_3$ | Cl | | | | | CH | CH | C | CH | CH | CH | CH | CH |
| 180–182 | $CH_3$ | $CH_2CH_3$ | $OCH_3$ | | | | | CH | CH | C | CH | CH | CH | CH | CH |
| 153–154 | $CH_3$ | $CH_2CH_3$ | $NO_2$ | | | | | CH | CH | C | CH | CH | CH | CH | CH |
| 128–131 | H | H | | | | | ⌬ | C | CH | C | CH | CH | CH | CH | CH |
| 130–135 | H | H | $CH_3$ | | | | ⌬ | CH | C | C | C | CH | CH | CH | CH |
| 192–193 | $CH_3$ | $CH_3$ | | | | | ⌬ | CH | C | CH | C | CH | CH | CH | CH |
| 173–175 | H | H | $CH_3$ | | $CH_3$* | | ⌬ | CH | C | C | N | CH | C | CH | C |
| 196–197 | $CH_3$ | $CH_2CH_3$ | | | | | | CH | N | CH | CH | CH | CH | CH | CH |
| 185–189 | $CH_3$ | $CH_2CH_3$ | | | | | ⌬ | CH | C | CH | C | CH | CH | CH | CH |

*$(R_5)_1$ and $(R_6)_1$ form ⌬ and $(R_5)_2$ is $CH_3$.

Some other compounds which can be made by our process by substituting the appropriate reactants are shown in Table II below. In each case $R_0$ is H and $w$, $v$, $x$, and $y$ are 1. In Table II, the various headings are to be understood as having the same significance as in Table I.

4. A dioxocin as defined in claim 1 wherein $R_1$ is H or alkyl having up to eighteen carbon atoms.

5. A dioxocin as defined in claim 1 wherein $R_1$ is H or alkyl having up to eighteen carbon atoms.

TABLE II

| $R_1$ | $R_2$ | $R_3$ | $R_4$ | $R_5$ | $R_6$ | $R_3+R_4$ | $R_5+R_4$ | A | B | E | F | G | J | K | L |
|---|---|---|---|---|---|---|---|---|---|---|---|---|---|---|---|
| $C_3H_7$ | $C_{16}H_{33}$ | | | | | |  | CH | CH | CH | C | CH | C | CH | CH |
| $C_6H_{13}$ | $C_{17}H_{35}$ | OH | | | | |  | C | C | CH | C | CH | CH | CH | CH |
| $C_{16}H_{33}$ | $C_3H_7$ | $OC_{16}H_{33}$ | | | $CH_3$ | | | CH | CH | C | CH | CH | C | CH | CH |
| Phenyl | $CH_3$ | $C_4H_9$ | | | | |  | CH | C | CH | C | CH | N | C | CH |
| OH | $C_4H_9$ | | | | | |  | C | CH | C | N | CH | CH | CH | N |
| Napthyl | $C_7H_{15}$ | | | | | | | CH | CH | CH | CH | CH | CH | N | N |
| $C_4H_9$ | Phenyl | | $CH_3$ | | | |  | CH | CH | C | CH | C | C | CH | CH |
| $C_{18}H_{31}$ | $C_4H_9$ | | OH | | | | 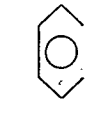 | C | C | C | CH | N | CH | CH | CH |
| $C_3H_7$ | $C_{18}H_{37}$ | $C_{16}H_{37}$ | | | | | | CH | CH | C | CH | CH | CH | CH | CH |
| $C_{18}H_{37}$ | $C_4H_9$ | | $C_4H_9$ | | | | | CH | CH | N | CH | CH | CH | N | C |
| $C_6H_9$ | $C_6H_{13}$ | | | | | |  | CH | CH | C | C | C | C | CH | CH |
| $C_7H_{15}$ | $C_{16}H_{33}$ | $CH_3$ | | | $OC_{16}H_{33}$ | | | CH | CH | CH | C | C | CH | CH | CH |

What is claimed is:

1. A dioxocin having the formula

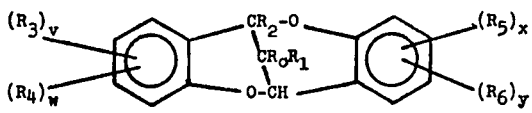

where each of $v$, $w$, $x$, and $y$ independently is a number from 0 to 4; $R_0$ is H; $R_1$ is H, carbocyclic aryl having up to ten carbon atoms, or alkyl having up to eighteen carbon atoms; $R_0$ and $R_1$ may together form the cyclohexane ring; $R_2$ is H, carbocyclic aryl having up to ten carbon atoms, or alkyl having up to eighteen carbon atoms; each of $R_3$, $R_4$, $R_5$ and $R_6$, being absent when the corresponding subscript $v$, $w$, $x$ or $y$ is 0, if present, is independently carbocyclic aryl having up to ten carbon atoms, alkyl having up to eighteen carbon atoms, $NO_2$, halogen or OM where M is H or alkyl of up to eighteen carbon atoms provided that M is H or methyl only when $R_1$ or $R_2$ is other than H; and $R_3$ combined with $R_4$, as well as $R_5$ combined with $R_6$, may form the benzene, naphthalene, anthracene or phenanthrene ring.

2. A dioxocin as defined in claim 1 wherein $R_3$, $R_4$, $R_5$, and $R_6$ are in the 2, 4, 8, and 10 positions.

3. A dioxocin as defined in claim 1 wherein $R_3$ and $R_5$ are in the 2 and 8 positions and $R_4$ and $R_6$ are H.

6. A dioxocin as defined in claim 1 wherein $R_2$ is H or alkyl having up to eighteen carbon atoms.

7. A dioxocin as defined in claim 1 wherein $R_0$, $R_1$ and $R_2$ are H; $v$, $w$, $x$ and $y$ are each 0.

8. A dioxocin as defined in claim 2 wherein each of $R_3$, $R_4$, $R_5$ and $R_6$, if present, is carbocyclic aryl having up to ten carbon atoms, alkyl having up to eighteen carbon atoms, $NO_2$ or halogen.

9. A process for making a dioxocin having the formula

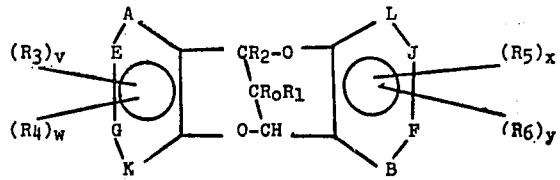

by reacting in the presence of an acid catalyst (1) an o-vinylhydroxy aromatic compound having the formula

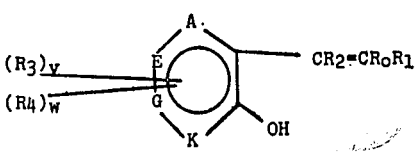

and (2) an o-hydroxyaldehyde aromatic compound having the formula

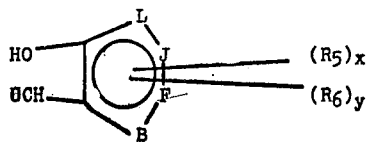

where each of $v$, $w$, $x$, and $y$ independently is a number from 0 to 4; each of A, B, E, F, G, J, K, and L independently is N or CH provided that neither A and E, E and G, G and K, B and F, F and J or J and L can simultaneously be N; $R_0$ is H; $R_1$ is H, OH, carbocyclic aryl having up to ten carbon atoms, or alkyl having up to eighteen carbon atoms; $R_0$ and $R_1$ may together form the cyclohexane ring; $R_2$ is H, carbocyclic aryl having up to ten carbon atoms, or alkyl having up to eighteen carbon atoms; each of $R_3$, $R_4$, $R_5$ and $R_6$, being absent when the corresponding subscript $v$, $w$, $x$ or $y$ is 0, if present, is independently carbocyclic aryl having up to ten carbon atoms, alkyl having up to eighteen carbon atoms, $NO_2$, halogen or OM where M is H or an alkyl radical having up to eighteen carbon atoms; and $R_3$ combined with $R_4$, as well as $R_5$ combined with $R_6$, may form the pyridine, pyrimidine, quinoline, benzene, naphthalene, anthracene or phenanthrene ring.

10. A process as defined in claim 9 wherein the acid catalyst is aqueous HBr.

11. A process a defined in claim 9 wherein the acid catalyst is aqueous HBr and a liquid organic acid.

12. A process a defined in claim 9 wherein the acid catalyst is an acid and a hydrocarbon solvent.

13. A process a defined in claim 9 wherein only one of A, B, E, and F and only one of B, F, J, and L may be N.

14. A process a defined in claim 9 wherein $R_3$, $R_4$, $R_5$, and $R_6$ are in the E, K, L, and F positions.

15. A process a defined in claim 9 wherein $R_3$ and $R_5$ are in the E and F positions and $R_4$ and $R_6$ are H.

16. A process as defined in claim 9 wherein $R_1$ is H, OH, or alkyl having up to eighteen carbon atoms.

17. A process as defined in claim 9 wherein $R_1$ is H or alkyl having up to eighteen carbon atoms.

18. A process a defined in claim 9 wherein $R_2$ is H or alkyl having up to eighteen carbon atoms.

19. A process a defined in claim 9 wherein any ring formed by the combination of $R_3$ and $R_4$ is the pyridine, quinoline, benzene, naphthalene, anthracene, or phenanthrene ring.

20. A process a defined in claim 9 wherein any ring formed by the combination of $R_5$ and $R_6$ is the pyridine, quinoline, benzene, naphthalene, anthracene, or phenanthrene ring.

21. A process a defined in claim 9 wherein $R_0$, $R_1$, and $R_2$ are H; $v$, $w$, $x$ and $y$ are each 0 and A, B, E, F, G, J, K and L are CH.

References Cited

Bhatia et al., Tetrahedron Letters, 1717–1720 (1966).
Nair et al., Tetrahedron Letters, 5357–61 (1966).

HENRY R. JILES, Primary Examiner

J. M. FORD, Assistant Examiner

U.S. Cl. X.R.

71—92, 88, 94; 260—256.4, 288, 289, 296, 297, 345.2, 618, 999